Dec. 4, 1923.

H. R. TUCKER

THRASHING DEVICE

Filed Dec. 16, 1922

1,476,660

WITNESSES

Edw. Thorpe

INVENTOR
H. R. Tucker
BY
ATTORNEYS

Patented Dec. 4, 1923.

1,476,660

UNITED STATES PATENT OFFICE.

HENRY R. TUCKER, OF BALBOA, CANAL ZONE.

THRASHING DEVICE.

Application filed December 16, 1922. Serial No. 607,416.

*To all whom it may concern:*

Be it known that I, HENRY R. TUCKER, a citizen of the United States, and a resident of Balboa, Canal Zone, have invented a new and Improved Thrashing Device, of which the following is a description.

My invention relates to a device for thrashing rice, wheat and other grains and the invention has for its general object to provide a manually operated thrashing device that may be set up in any convenient place, such as on a table for example, and designed primarily for use in isolated situations in lieu of the primitive flail.

Reference is to be had to the accompanying drawings forming a part of this specification, it being understood that the drawings are merely illustrative of one example of the invention.

Figure 1:
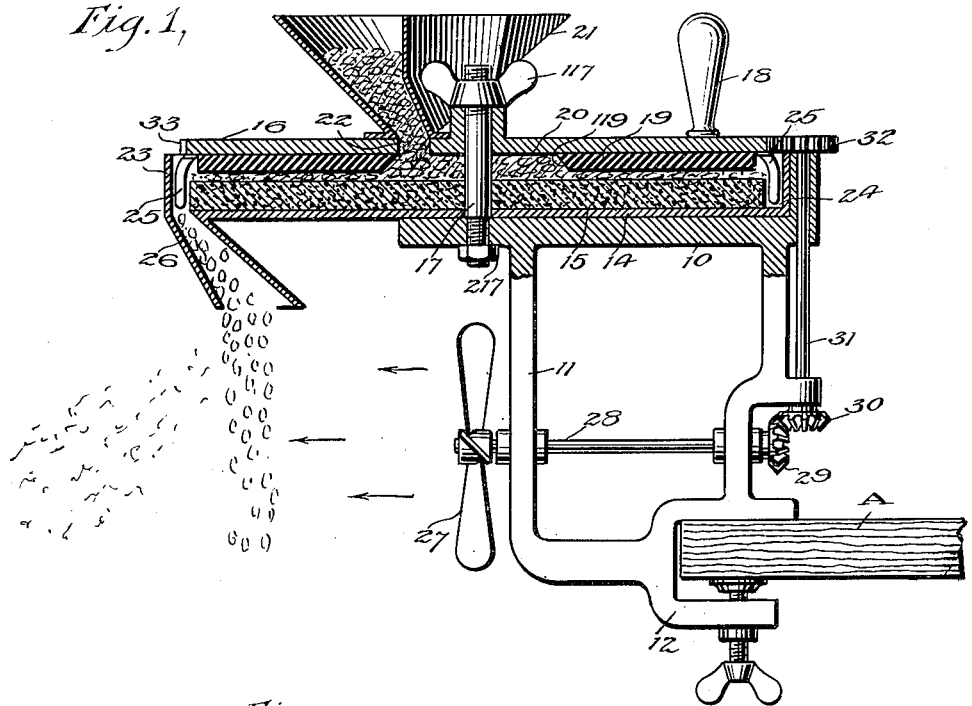
Figure 1 is a vertical section of a thrashing device embodying my invention.
Figure 2:
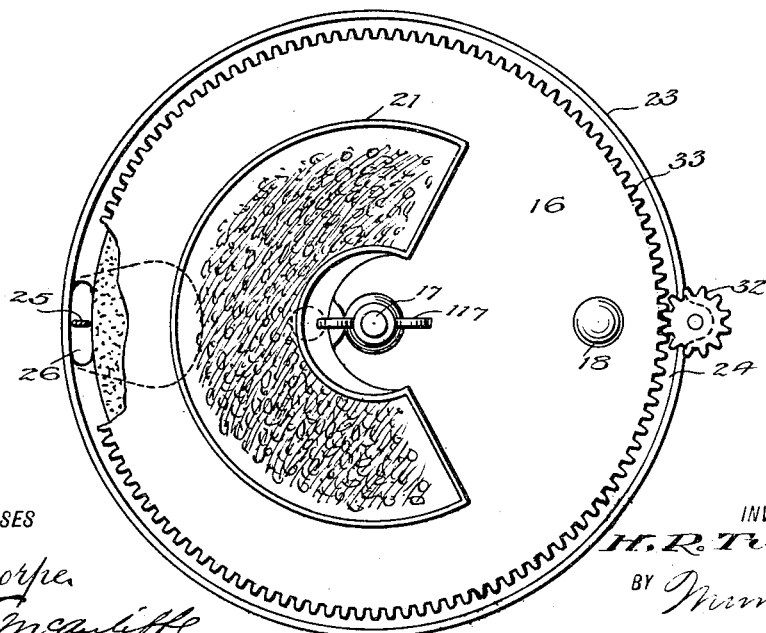
Figure 2 is a plan view thereof.

In carrying out my invention in practice a suitable base or support is provided, here shown as in the form of a base plate 10 on a frame 11, said frame being provided with a clamp 12 including a clamp screw 13 for attaching the device to a table, a portion of which is indicated at A.

Secured to the top of the base 10 by any suitable means is a disk 14 provided with a layer 15 of abrading material such as a mixture of cement, emery, carborundum, or the like. Above the surface of the abrading material 15 is disposed a disk 16 turnably mounted by a vertical spindle 17 secured to the base 10 and extending through said disk at the center, said disk having a nut 117. The nut 117 on the top of spindle 17 and a second nut 217 at the lower end thereof serve to adjust the grinding space between the substance 15 and the rubber surface 19. The disk 16 has a suitable handle 18 for turning the same about a spindle 17 as an axis and relatively to the abrading material 15. On the under side of the disk 16 is a facing of rubber indicated at 19 cut out at the center and preferably chamfered at said opening as indicated at 119. The disk 16 is further provided with a hopper 21 advantageously of arcuate form and discharging at the bottom through an opening 22 in disk 16 leading to the space between the abrading material 15 and the rubber facing 19 at the opening 20.

The edge of the disk 14 is formed with an annular vertical flange 23 and within said flange between the same and the abrading material 15 is an annular trough 24.

The grain is fed to the hopper 21 and with the turning of the disk 16 by its handle 18 the husk will be broken up and the husk and grain will advance to the annular trough 24.

It is to be understood that the disk 16 is not turned at a speed that would develop a centrifugal force opposing the flow from the hopper 21 downwardly to the space between the disks.

On the under side of the disk 16 are depending scrapers 25, there being indicated two diametrically opposite on the disk, said scrapers travelling in the trough 24 and serving to advance the grain and chaff to a hopper chute from the bottom of which material is permitted to escape.

A fan 27 is provided below and adjacent to the chute 26, said fan being on a transverse shaft 28 turning in frame 11. The shaft 28 may be driven in any suitable manner, there being shown a bevel pinion 29 thereon meshing with a similar pinion 30 on a vertical shaft 31 having a spur pinion 32 meshing with a fixed gear or annular rack 33 on the disk 16 at the periphery.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A thrashing device comprising a base, means to secure said base in fixed position, a disk on said base, an abrading substance on said disk, a second disk above the said abrading material and spaced therefrom, a rubber facing on the under side of the second disk, said facing presenting an opening at the center, a hopper on said disk discharging to the space between the said abrading substance and the second disk at the said opening, and means to turn said second disk.

2. A thrashing device comprising a base, means to secure said base in fixed position, a disk on said base, an abrading substance on said disk, a second disk above the said abrading material and spaced therefrom, a rubber facing on the under side of the second disk, said facing presenting an opening at the center, a hopper on said disk discharging to the space between the said abrading substance and the second disk at the said opening, and means to turn said second disk; together with an annular trough outside of the abrading substance scraping means on the second disk and operating in said trough, and a chute leading downwardly from said trough.

3. A thrashing device of the class described, including a fixed disk having abrading means thereon, a revoluble disk above the fixed disk, a hopper carried by the revolving disk to revolve therewith, a chute at the periphery of the fixed disk from which the material escapes, a fan disposed below and adjacent to said chute, and means to drive said fan from said revoluble disk.

4. A thrashing device of the class described, including a fixed disk having its surface covered with an abrading substance, a revoluble disk above the first disk and provided with an unstudded rubber surface at the under side directly coacting with said abrading substance, said rubber surface constituting the sole thrashing means on the second mentioned disk, and means to feed grain through the first disk to the space between the abrading material and the rubber surface.

5. A thrashing device of the class described, comprising a frame having a base thereon, a disk on said base and provided with abrading means, a revoluble disk above the first disk, means to feed material to be thrashed through said revoluble disk, an annular trough at the periphery of the fixed disk, a chute leading downwardly from said trough, means to cause material received by said trough to be conveyed to said chute, a fan disposed below and adjacent to the chute, a horizontal shaft on which said fan is secured, a vertical shaft geared to the first shaft and turning in said frame, a pinion on the vertical shaft, and an annular gear on the revoluble disk in mesh with said pinion.

HENRY R. TUCKER.